Patented July 17, 1951

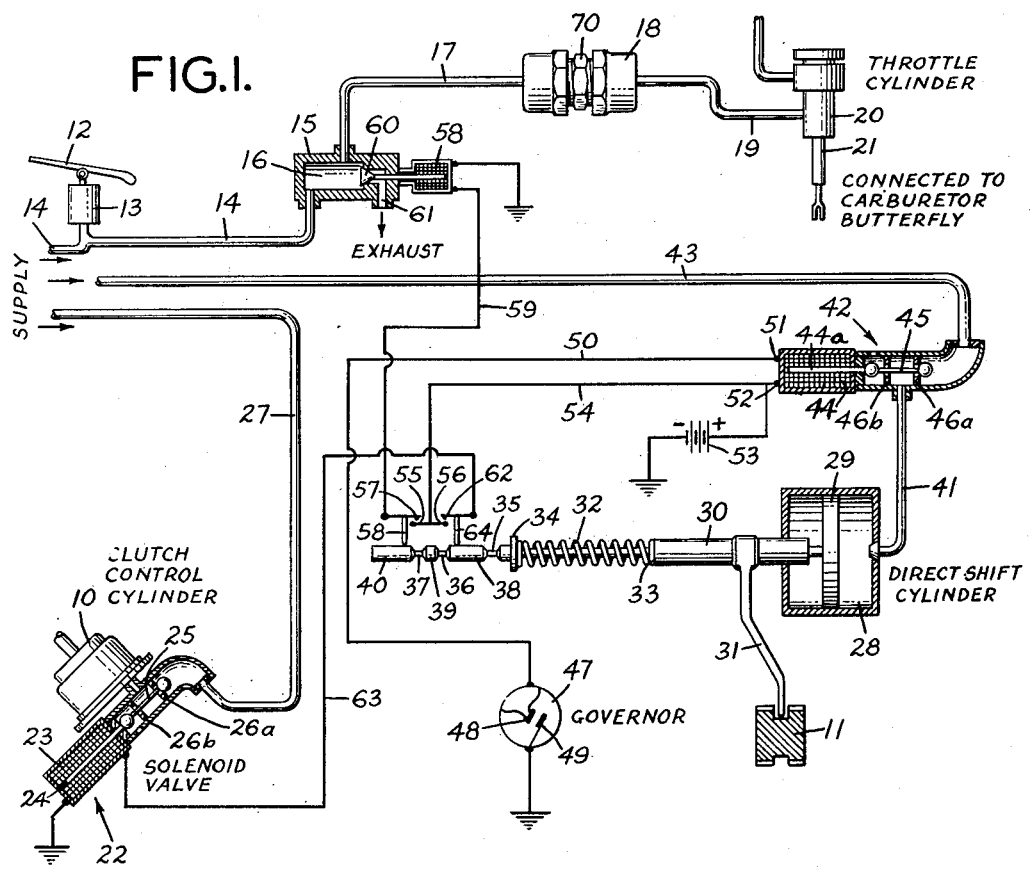
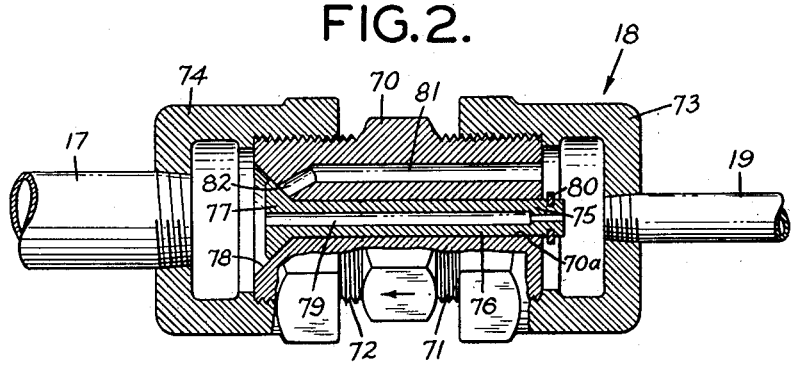

2,560,870

UNITED STATES PATENT OFFICE 2,560,870

AUTOMATIC SHIFTING MECHANISM FOR HYDRAULIC-MECHANISM TRANSMISSIONS

Alvin F. Hulick, Macungie, Pa., assignor to Mack Manufacturing Corporation, New York, N. Y., a corporation of Delaware Application October 9, 1947, Serial No. 778,809

3 Claims. (Cl. 74—472)

This invention relates to improvements in control systems for combined mechanical and hydraulic transmissions, and it relates particularly to improved electrical and fluid pressure control systems for automatically controlling combined mechanical and hydraulic transmissions in vehicles of various types, such as buses, trucks and the like.

It has been suggested heretofore that hydraulic torque converters can be used with a simple 2-speed gear type transmission to obtain substantially automatic control of a vehicle throughout its entire speed range. Generally, such transmissions include a conventional single or multistage torque converter which is interposed between the crankshaft of an internal combustion engine and an output shaft and is adapted to be actuated by the engine in the low speed range of the vehicle, that is, when starting from a standstill and accelerating up to about 25 miles per hour. Above a speed of 25 miles per hour, the gear shift mechanism is actuated by means of a governor to shift the mechanical transmission into high gear, and, at the same time, to unclutch or lock out the torque converter so that the drive takes place from the engine directly through the high speed gear to the output shaft. Various systems have been provided heretofore for producing such automatic shifting and unclutching of the torque converter, but they have had certain disadvantages resulting from complex structure and from the lack of suitable control valves whereby the throttle control cylinder may be actuated in synchronism with the gear shifting and clutching operations.

An object of the present invention is to provide an improved control system for such combined hydraulic-mechanical speed transmissions.

Another object of the invention is to provide a simplified and more responsive control system for automatically controlling the operation of such hydraulic and mechanical gear shift transmissions.

A further object of the invention is to provide a simplified throttle control valve for pneumatic and electric control systems for combined hydraulic and mechanical automatic vehicle transmissions.

Other objects of the invention will become apparent from the following description of a typical control system embodying the present invention.

In accordance with the present invention, we have provided a system wherein the throttle of the vehicle is controlled by means of an accelerator control valve which supplies air to and discharges it from the throttle control cylinder. The throttle control cylinder is also associated with a vehicle speed control governor which acts to exhaust the fluid from the cylinder to allow the engine to come to an idling speed when a shifting operation occurs, either during acceleration or deceleration of the vehicle.

The governor likewise controls the operation of a shifting mechanism for the 2-speed transmission and controls a clutch whereby the hydraulic torque converter can be rendered operative or inoperative in various speed ranges of the vehicle.

A particular feature of the invention is a novel control valve interposed between the accelerator valve and the throttle control cylinder, which permits a gradual flow of fluid to the throttle cylinder, and thereby prevents to fast acceleration of the vehicle but which, at the same time, can be actuated to dump the fluid from the throttle control cylinder very quickly to allow the engine to come to an idling speed when a shifting operation occurs.

The above-described transmission control system assures smooth operation of the vehicle throughout its entire speed range, even and quick shifting of the transmission from the low speed range to the high speed range, and assures positive shifting to the desired speed, either during acceleration or deceleration of the vehicle.

For a better understanding of the present invention, reference may be had to the accompanying drawing, in which:

Figure 1 is a diagrammatic showing of the combined fluid and electrical control system for the transmission, the elements of the transmission itself not being disclosed completely; and Figure 2 is a view in longitudinal section of a novel throttle control valve for the system.

The system chosen for purposes of illustration is useful with known types of transmissions which include a torque converter mechanism, not shown in the drawings, that is responsive to the operation of a clutch control cylinder 10 to either connect it with or disconnect it from the engine and the output shaft of the vehicle.

The transmission also includes a shiftable clutch member 11 which cooperates with other clutch and gear elements in a mechanical transmission to provide two different speed ratios. When the clutch element 11 is in the low speed position, transmission takes place from the engine through the torque converter and the gear transmission to the output shaft and to the wheels of the vehicle. When the clutch member 11 is in the high speed position, the clutch operating cylinder is actuated to unclutch the torque converter from the drive shaft and the engine, and a direct drive is established from the engine through the high speed gear to the output shaft of the vehicle. Such transmissions are conventional, do not form a part of the present invention and are not illustrated herein.

The control system for the transmission described above includes an accelerator pedal 12 which actuates a valve member 13 to control the flow of fluid through the conduit 14 from a source of fluid supply, such as, for example, a compressed air receiver, not shown. When the pedal is depressed, air flows from the valve 13 through a conduit 14 to an exhaust control valve mechanism 15 having a chamber 16 therein which communicates directly with the conduit 14 and another conduit 17. The conduit 17 leads to a control valve 18, later to be described, which is connected in turn by a conduit 19 to a throttle cylinder 20 of conventional type. The piston rod 21 of the throttle cylinder may be connected to the butterfly valve in the carburetor so that the movement of the accelerator 12 is transmitted by the fluid to the throttle cylinder and proportionately displaces the carburetor butterfly valve.

When the pedal 12 is released, air is vented to atmosphere from the cylinder 20 through the valve 13. The clutch operating cylinder 10 for connecting and disconnecting the torque converter is controlled by means of a solenoid valve 22 which includes a solenoid coil 23, an armature rod 24 and a dumb-bell valve 25 having balls for alternate cooperation with valve seats 26a and 26b. One ball of the dumb-bell 25 cooperates with the seat 26a to allow or prevent the flow of air to the clutch cylinder 10 through a conduit 27 from a source of air pressure. The other ball of the valve 25 cooperates with the seat 26b to allow air to be vented to atmosphere from the cylinder 10 when the ball is unseated and to prevent venting of the air from the cylinder when the ball is seated and air is being supplied to the cylinder from the conduit 27. Thus, when the solenoid valve is energized, as will be described hereinafter, the valve 25 is displaced and fluid under pressure is supplied to the clutch operating cylinder to unclutch the torque converter from the engine. When the solenoid valve 22 is deenergized, air is exhausted from the clutch operating cylinder to clutch the torque converter to the crankshaft of the engine.

The clutch member 11 is shifted between its high and low gear ratio positions by means of a shifting cylinder 28 which has a piston 29 reciprocable therein. The piston is provided with a piston rod 30 which carries a shifter fork 31 for shifting the clutch element 11 to the left or right. The piston 29 and piston rod 30 are normally urged to the right by means of a compression spring 32 mounted between a shoulder 33 on the piston rod and a fixed abutment 34 carried by a stationary portion of the transmission. The piston rod is further provided with a series of grooves 35, 36 and 37 with adjacent enlargements 38, 39 and 40, the purpose of which will be explained hereinafter.

Movement of the piston rod 30 and the shifter fork 31 to the left is produced by means of fluid pressure supplied through the conduit 41 under the control of a solenoid valve 42 which is connected by means of a conduit 43 to the source of fluid under pressure. The solenoid valve 42 is similar to the solenoid valve 22 in that it includes a solenoid coil 44 for shifting an armature 44a to the right to shift a dumb-bell valve 45 relatively to the seats 46a and 46b in the casing of the valve. When the solenoid coil 44 is energized, fluid under pressure flows through the conduit 43, the valve 42 and the conduit 41, to the cylinder 28. When the solenoid coil 44 is deenergized, air is exhausted from the cylinder 28 and the spring 32 shifts the piston 30 and the clutch 11 toward the right.

The above-described mechanism is controlled by a governor 47 which is connected to the output shaft of the transmission to render the governor responsive to vehicle speed. The governor 47 includes a pair of electrical contacts 48 and 49 which are disengaged in a speed range below about 25 miles per hour, for example, and are engaged by the action of the governor in a speed range of 25 miles per hour, or higher. The contact 49 may be grounded as to the vehicle frame or transmission while the contact 48 is connected by a conductor 50 to one terminal 51 of the solenoid 44, and through the other contact 52 of the solenoid to a source of electrical energy 53 such as a battery, the other terminal of which is grounded. The terminal 52 of the solenoid 44 is also connected by means of a conductor 54 to a pair of fixed contacts 55 and 56. The contact 55 cooperates with a contact 57 which is movable into and out of engagement with the contact 55 by means of a pin 58 which is engageable selectively in the groove 37 or on the thickened portions 39 and 40 on the piston rod 30, depending upon the position of the latter. The contact 57 is connected to a solenoid coil 58 by means of the conductor 59 while the other terminal of the solenoid 58 is connected to the ground. The solenoid 58 is used to open a cone type poppet valve 60 located at one end of the chamber 16 of the valve 15 so that the air in this chamber and in the throttle cylinder can be vented to atmosphere through a port 61 in the valve 15. The poppet valve 60 is normally closed, except when the throttle cylinder is in idling position during a shifting operation.

The fixed contact 56 cooperates with a movable contact 62 which is connected by means of the conductor 63 to one terminal of the solenoid coil 23, the other terminal of the coil being grounded. The contact 62 is shifted into and out of engagement with the contact 56 by means of a pin 64 which cooperates with the grooves 35 and 36 or the thickened portions 38 and 39 on the piston rod 30.

In operation, when the vehicle is started from a standstill, the accelerator 12 is depressed, thereby admitting air through the valve 15 and the valve 18 to the throttle cylinder 20 with the result that the butterfly valve of the carburetor is open to supply additional fuel to the engine to accelerate it. During acceleration of the engine, the torque converter is connected between the engine and the output shaft for the reason that the solenoid valve 22 is deenergized, the contacts 56 and 62 being disengaged, and air is exhausted from the clutch operating cylinder 10, as shown in Figure 1. Also, the piston 30 and the shifter fork 31 are shifted to the position shown by the spring 32, inasmuch as air is not supplied to the cylinder 28 and the spring 32 is effective to cause displacement of the clutch 11 into low speed position. At this time, the pin 64 engages enlarged portion 38 so that the contacts 56 and 62 are out of engagement. The contacts 55 and 57 are out of engagement for the reason that the pin 58 is resting on the enlarged portion 40 of the piston rod. As the engine accelerates the vehicle, no change in these conditions occurs until the governor causes the contacts 48 and 49 to engage at, for example, about 25 miles per hour vehicle speed. When the contacts 48 and 49 close, a circuit is completed from ground through the battery 53, terminal 52, solenoid 44, terminal 51, conductor 50, contacts 48 and 49 to ground, thereby energizing the solenoid 44 and opening the valve 42.

When air is supplied to the cylinder 28, the piston 29 is shifted to the left, thereby unclutching the low speed transmission and moving the clutch 11 toward high speed relation. As this operation occurs, the pin 58 engages in the groove 37, allowing the contacts 55 and 57 to engage, thereby completing a circuit from the battery 53, terminal 52, conductor 54, contacts 55, 57, conductor 59, solenoid 58 to ground, thereby energizing the solenoid 58, opening the valve 60 and discharging air from the throttle cylinder 20 to permit the butterfly valve to close and cause the engine to come to idling speed. As the piston moves farther to the left into high speed position, the contacts 56 and 62 reengage as the pin 64 engages in the groove 35 and the contacts 55 and 57 disengage as the pin 58 rides up on the portion 39. The solenoid 22 is thereby energized and the air is supplied to the cylinder 29 to unclutch or uncouple the torque converter from the system. Also, the solenoid coil 58 of the valve 15 is deenergized and the valve 61 closes to prevent further venting of air through the port 61, thereby allowing the throttle cylinder to be reenergized to bring the engine up to operating speed.

If the speed of the vehicle diminishes, as, for example, when climbing a hill, a reversal of the above cycle takes place with the governor contacts 47 and 48 opening to permit the air to be exhausted from the cylinder 28 and allowing the spring 32 to shift the clutch 11 into low speed relationship in the transmission. As the shifter rod 30 moves toward the right, the contacts 55 and 57 engage, and the contacts 56 and 62 disengage, thereby reducing the engine speed to idling and venting air from the clutch cylinder 10. The transmission therefore shifts automatically into low speed and operates through the torque converter until the vehicle again attains a speed of 25 miles an hour or other selected speed, where a shift into high again occurs. Preferably, the governor is so regulated that the shift into low speed occurs at a speed 4 or 5 miles lower than the speed at which the shift into high takes place.

In order to overcome shock in the system between the accelerator and the throttle cylinder and to assure more rapid dumping of the air from the throttle cylinder 20 during a shifting operation, a novel form of control valve 18 is used in the system. This valve is best shown in Figure 2 of the drawing. The valve consists of a valve body portion 70 having a non-circular portion at about its middle end having threaded ends 71 and 72 for receiving internally threaded cap members 73 and 74 by means of which the conduits 17 and 19 are coupled to the valve 18. The body portion 20 is provided with a centrally located bore 70A for receiving the stem 75 of a valve member 76. The valve member 76 is provided with a cone type valve head 77 which cooperates with a conical valve seat 78 formed on the end of the valve body 70. The valve 76 is provided with a small longitudinal bore 79 through which air can flow from the conduit 17 to the conduit 19 at a relatively slow rate, so that even if the accelerator pedal is depressed suddenly, the piston 21 is displaced only slowly. This prevents the engine from accelerating too rapidly, which would make the shifting rough. The valve 76 is retained against movement out of the bore 74 by means of a split ring 80 on its end which permits limited movement of the valve in the bore 74.

Inasmuch as it is desired to vent the air rapidly from the throttle cylinder when a shifting operation occurs, a separate port or bore 81 is provided in the body portion 70 of the valve. This bore 81 extends longitudinally of the body 70 and terminates in an inclined portion 82 which opens into the conical seat 78 and is normally closed by the plug head 77.

When the valve plug 60 of the valve 15 is unseated during a shifting operation to vent the air from the throttle cylinder 20, the pressure of the air in the cylinder exerted through the conduit 19 will unseat the valve 77 allowing air to flow through not only the central bore 79 in the valve 76 but also through the passage 81, 82 to quickly restore the carbureter butterfly valve to its idling position. The above-described valve assures smooth operation of the system during acceleration of the vehicle and quick actuation of the throttle cylinder 20 to bring the engine to idling speed when a shifting operation occurs.

From the preceding description, it will be apparent that a system has been provided whereby accurate and positive governor control of an automatic transmission can be obtained and that the shifting operation can be accomplished by the system smoothly and efficiently and with a minimum of interference between the various elements of the transmission during such shifting operation, either during acceleration or deceleration.

It will be understood that the system is susceptible to considerable modification in the arrangement and relationship of the parts thereof and that some of the functions of the control valves can be combined or modified as the purpose demands. Moreover, the system can be arranged to operate as a hydraulic or vacuum system in ways recognized in the art. Therefore, the form of the invention disclosed herein should be considered as illustrative and not as limiting the scope of the following claims.

I claim:

1. In a shifting mechanism for a vehicle having a throttle controlled engine and a hydraulic mechanical transmission shiftable into high and low speed operating ranges; the combination of a cylinder for controlling the throttle of the engine, an accelerator controlled valve for supplying fluid to and discharging it from said cylinder to regulate the speed of the engine, a venting valve interposed between said cylinder and said accelerator controlled valve, said venting valve being movable from a closed position to an open position to vent fluid from said throttle control cylinder to cause said cylinder to assume a condition corresponding to idling speed of said engine, a fluid regulating valve interposed between said throttle cylinder and said venting valve having a cooperating valve plug and valve seat, and passages therein for retarding flow of fluid from said venting valve to said throttle cylinder and allowing more rapid flow of fluid from said cylinder to said venting valve, means to shift said transmission selectively from one of said ranges into the other, a governor responsive to vehicle speed, means responsive to said governor at a predetermined vehicle speed to actuate said shifting means to shift said transmission from one range into the other range and to open said venting valve while said transmission is being shifted from one range to the other.

2. In a shifting mechanism for a vehicle having a throttle controlled engine and a hydraulic mechanical transmission shiftable into neutral and into high and low speed operating ranges; the combination of a cylinder for controlling the throttle of the engine, an accelerator controlled valve to supply liquid to and discharge it from said cylinder to regulate the speed of the engine, a venting valve interposed between said cylinder and said accelerator control valve, said venting valve being shiftable between a normally closed position and an open position to vent fluid from said throttle control cylinder to cause said cylinder to assume a condition corresponding to idling speed of said engine, a fluid regulating valve interposed between said throttle cylinder and said venting valve having a cooperating valve plug and valve seat, and passages therein for retarding flow of fluid from said venting valve to said throttle cylinder, and allowing more rapid flow of fluid from said cylinder to said venting valve, means to shift said transmission selectively into neutral and into either of said operating ranges, a governor responsive to vehicle speed, means responsive to said governor at a predetermined vehicle speed for actuating said shifting means to shift said transmission from one range into neutral and from neutral into the other range, and means responsive to shifting of said transmission from one range into neutral for opening said venting valve to bring said engine to idling speed and for closing said venting valve when said transmission is in either of its operating ranges.

3. In a shifting mechanism for a vehicle having a throttle controlled engine and a hydraulic mechanical transmission shiftable into neutral and into high and low speed operating ranges, selectively; the combination of the cylinder for controlling the throttle of the engine, an accelerator controlled valve for supplying fluid to and discharging it from said cylinder to regulate the speed of the engine, a venting valve interposed between said cylinder and said accelerator control valve, said venting valve being movable from a normally closed position to an open position to vent fluid quickly from said throttle controlled cylinder to cause said cylinder to assume a condition corresponding to idling speed of said engine, a fluid regulating valve interposed between said throttle cylinder and said venting valve having a casing, a valve seat therein, a valve member reciprocable in said casing into and out of engagement with said seat, said valve member normally being urged into said seat by flow of fluid from said venting valve toward said cylinder, and out of said seat by flow of fluid in a reverse direction, said valve member having a restricted passage therethrough and said casing having another passage communicating with said seat for flow of liquid therethrough when said valve is out of engagement with said seat, means to shift said transmission selectively into neutral and into either of said operating ranges, a governor responsive to vehicle speed, means responsive to said governor at a predetermined vehicle speed for actuating said shifting means to shift said transmission from one range into neutral and from neutral into the other range, and means responsive to shifting of said transmission from one range into neutral to open said venting valve and bring the said engine to idling speed and close said venting valve when said transmission is shifted into either of its operating ranges.

ALVIN F. HULICK.

REFERENCES CITED

The following references are of record in the file of this patent:

UNITED STATES PATENTS

| Number | Name | Date |
|---|---|---|
| 577,489 | Mills | Feb. 23, 1897 |
| 620,936 | Kunzer | Mar. 14, 1899 |
| 917,642 | McElroy | Apr. 6, 1909 |
| 1,105,061 | Carpenter | July 28, 1914 |
| 1,375,555 | Brown | Apr. 19, 1921 |
| 1,486,617 | Teegardin | Mar. 11, 1924 |
| 1,747,456 | Noble | Feb. 18, 1930 |
| 1,979,488 | Perez | Nov. 6, 1934 |
| 2,051,553 | Fleischel | Aug. 18, 1936 |
| 2,133,575 | Rosenberg | Oct. 18, 1938 |
| 2,166,699 | Anderson | July 18, 1939 |
| 2,296,646 | Matulaitis | Sept. 22, 1942 |